Oct. 20, 1936.  W. KARAJAN ET AL  2,057,835
DEVICE FOR MEASURING THE THICKNESS OF SHEET METAL AND METAL FOIL
Filed Aug. 9, 1934  3 Sheets-Sheet 1
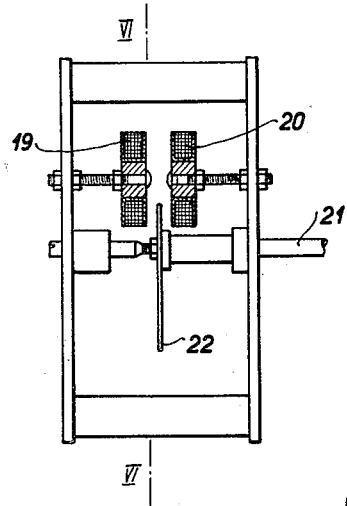
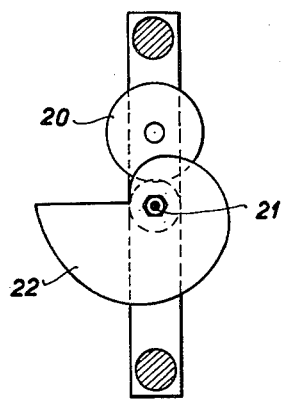
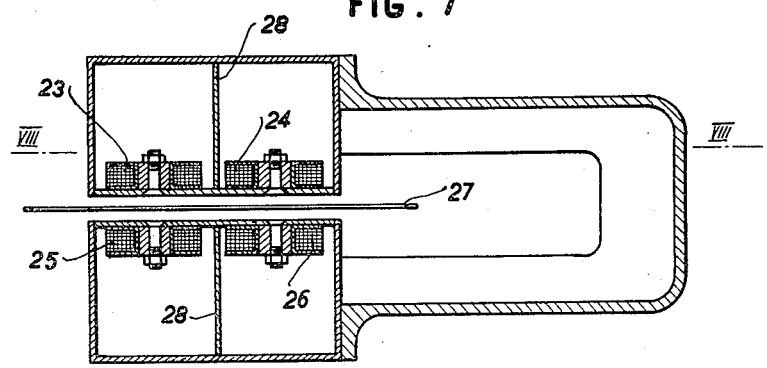
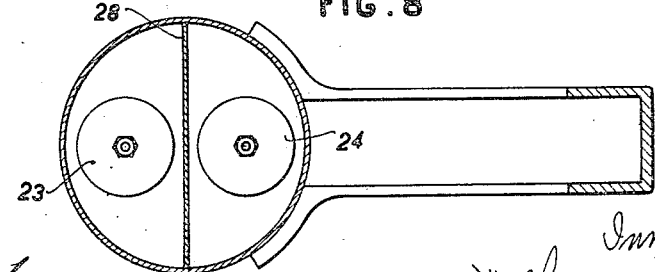
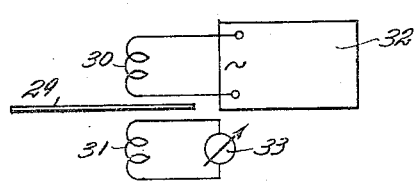

Oct. 20, 1936.  W. KARAJAN ET AL  2,057,835
DEVICE FOR MEASURING THE THICKNESS OF SHEET METAL AND METAL FOIL
Filed Aug. 9, 1934  3 Sheets-Sheet 3
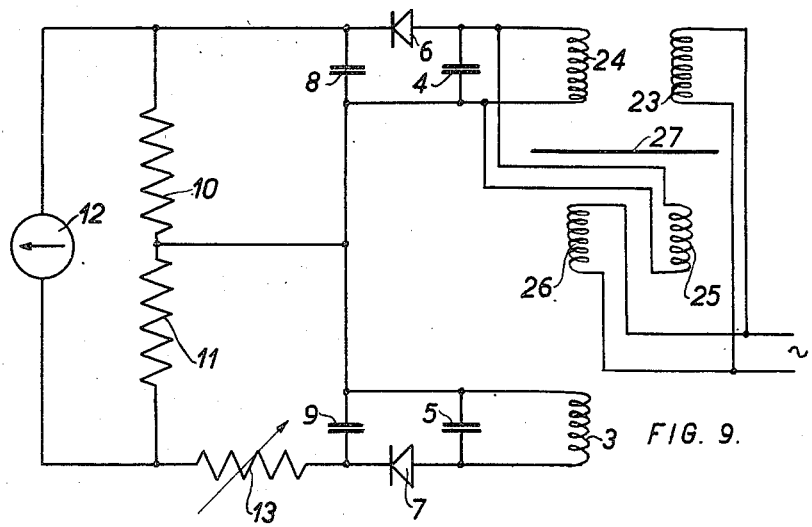
FIG. 9.
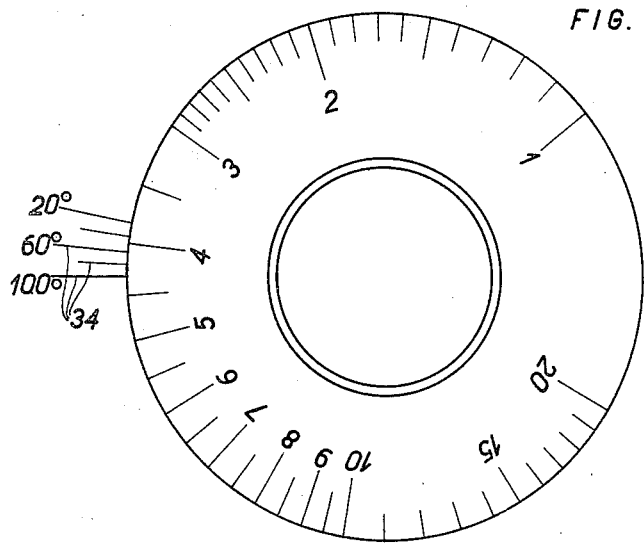
FIG. 10.
FIG. 11.
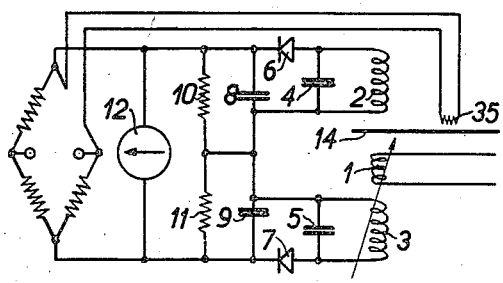
Inventors
Wolfgang Karajan
Ulrich Khuner
by B. Singer
Attorney Patented Oct. 20, 1936

2,057,835

UNITED STATES PATENT OFFICE 2,057,835

DEVICE FOR MEASURING THE THICKNESS OF SHEET METAL AND METAL FOIL

Wolfgang Karajan and Ulrich Khuner, Vienna, Austria

Application August 9, 1934, Serial No. 739,186 In Austria April 13, 1933

16 Claims. (Cl. 175—183)

This invention relates to the measurement of the thickness of sheet metal and metal foil. For ascertaining or checking the thickness of sheet metal and thin metal foil during the rolling process the known mechanical measuring methods are as a rule inadequate, since the required degree of accuracy is beyond the capacity of these methods. Electric methods of measurement are also known by which the variation in the capacity of a condenser is utilized for measuring slight variations in thickness. These methods, however, are limited in application to non-conducting or semi-conducting materials. In other known methods a measurement of thickness is effected by the arrangement that the self-induction of a coil is influenced by the metal foil to be measured. It is indispensable, however, for the success of this method that a constant and invariable clearance be maintained between the foil and the coil, a condition which can only be fulfilled with the very greatest difficulty, more particularly in the case of moving sheets or foil. The known methods based on the utilization of the absorption of X-rays are better suited for the purpose in view, but these methods necessitate complex apparatus and entail very considerable expense.

The present invention provides for the measurement of the thickness of stationary or moving sheet metal and metal foil, without touching the material, by measurement of the absorption of electro-magnetic waves, and consists essentially in passing the sheet or foil between coils the one group of which is traversed by alternating current and serves as a transmitter of electro-magnetic waves, while the voltages induced in the other set of coils, representing the receiver, provide a standard for the indication of the thickness of the sheet or foil. The invention further relates to various arrangements of connections, means for compensating for fluctuations of temperature, and particular arrangements of the coils.

Several forms of construction embodying the invention are shown by way of example in the accompanying drawings, in which:

Fig. 1 is a diagrammatic representation of the measuring instrument according to the invention.

Fig. 5 is an axial section and Fig. 6 a transverse section of a reaction variometer for use in the apparatus according to the present invention.

Fig. 7 is a section of the set of coils and their holder, taken through the axis of the coils.

Fig. 8 is a section taken at right angles to that of Fig. 7.

Fig. 9 shows an arrangement of connections in which the sets of coils of Figs. 7 and 8 are employed.

Fig. 10 shows the logarithmically graduated scale which is used for considering the temperature of the materials to be measured, and Fig. 11 shows an arrangement of connections in which a resistance thermometer is used.

Figure 2:
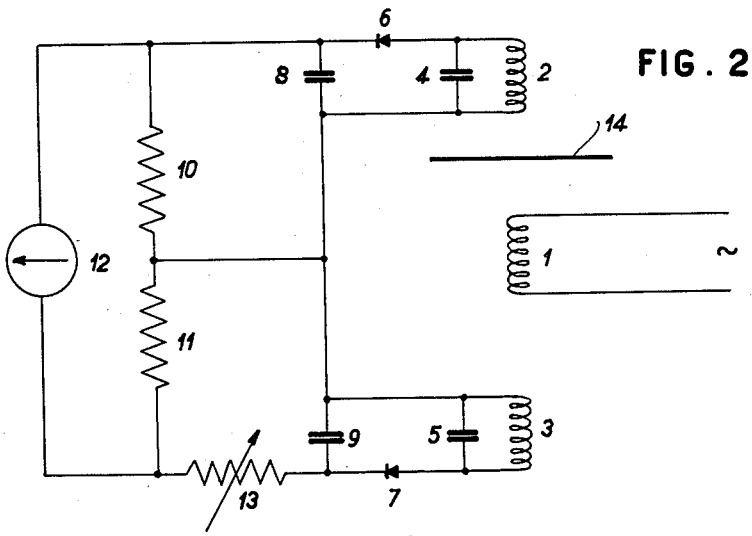
Fig. 2 is a diagram of the apparatus connected according to the differential principle, in which the measurement is effected with an adjustable resistance.

Referring to the drawings, the sheet metal or foil 29 (Fig. 1) to be measured is placed between the two coils 30, 31. The coil 30 is traversed by current supplied from an alternating current generator 32, and induces in the coil 31 voltages the magnitude of which can be measured for instance by means of the instrument 33 (Fig. 1). The magnetic alternating field produced by the transmitter coil 30 also induces in the foil 29 alternating currents which flow in phase opposition to the primary current and therefore weaken the total field strength. For a given strength of field and given conductivity coefficient of the material measured, the strength of these induced currents is dependent upon the thickness of the sheet or foil of this material, since this strength is determined solely by the electric resistance. The voltage induced in the receiver coil 31 thus depends on the field weakening action, that is to say on the absorption, of the sheet or foil, and thus provides a standard for the measurement of the thickness of the latter.

One of the main advantages of the method according to the present invention consists in the fact that the foil or sheet is not touched by any part of the measuring device, and can therefore not be damaged by the measuring procedure. Further, fluctuations in the position of the foil relatively to the coils is immaterial, provided only that the coils 30 and 31 be maintained at a constant and invariable distance apart.

The frequency of the electro-magnetic waves employed is determined according to the thickness and conductivity coefficient of the material to be measured, and must be the lower the thicker and better conducting this material is. Thus for example for aluminium foil of a thickness of one-hundredth of a millimetre frequencies of the order of $10^8$–$10^5$ cycles per sec. are suitable, whereas for thick sheets it is necessary to go as far as using frequencies falling within the range of the technically used alternating currents.

The sheet or foil to be measured can either be held stationary between the two coils or continuously drawn therebetween; in the latter case, if desired, immediately following the rolling process, for checking purposes.

Fig. 2 shows an arrangement of connections for the described method in which the differential principle is adopted to obtain independence of the measuring result from the effects of fluctuations in the voltage of the working current. The coil 1 induces voltages in the coils 2 and 3, so that after rectification by means of the valves 6, 7, direct current flows in the resistances 10, 11. The condensers 4 and 5 serve for the tuning of the coils, while 8 and 9 are merely bridging condensers. The resistances 10 and 11 are of equal magnitude. The instrument 12 is dead when currents of the same strength flow through the resistances 10 and 11. This condition can be established for a certain thickness of sheet or foil 14 by means of a certain setting of the adjustable resistance 13. The setting of the latter can thus be calibrated for certain thicknesses of sheet and foil. The employment of this arrangement of connections on the differential principle renders the measuring independent of fluctuations in the voltage of the working current.

If the sheet or foil is replaced by one of greater thickness, or if the thickness increases (for instance when checking the thickness after rolling) the voltage of the current induced in the coil 2 becomes less, and current flows in a certain direction through the instrument 12. If on the other hand the material becomes thinner the pointer of the instrument will be deflected in the opposite direction, if for instance a sensitive moving coil galvanometer be employed as the indicating instrument.

Figure 3:
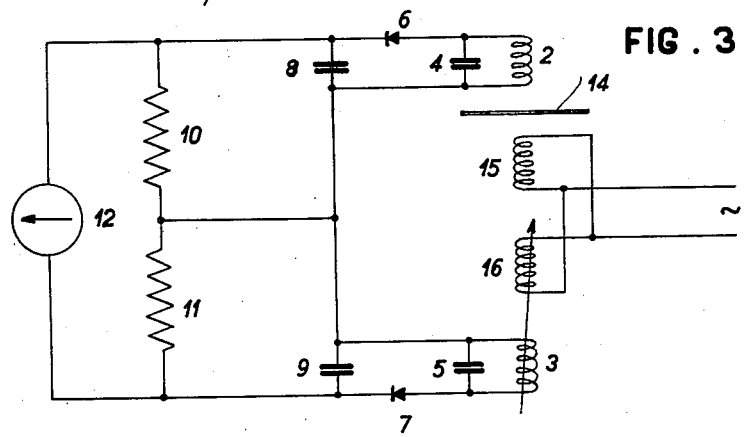
Fig. 3 shows an arrangement of connections when a reaction variometer is used.

The setting of the resistance 13 must be continuously adjustable and always reproducible. The regulation of current strength by the arrangement shown in Fig. 3 is more advantageous. In place of one coil traversed by current from the generator there are provided two similar coils 15 and 16 connected in parallel. The resistance 13 is dispensed with. The adjustment of the current strength is effected by alteration of the reaction of the coil 16 upon the coil 3.

For the setting of this variable reaction there is preferably employed a reaction variometer of a type shown in Figs. 5 and 6. To a rigid frame there are attached the two coils 19 and 20, the reaction of which is to be varied, in fixed spaced relation to each other. Between these coils there is provided the screen 22 which is made from thick sheet material of good conductivity, and which is mounted on the axle 21. The curved outer edge of this screen is of spiral or volute configuration, so that on rotation of the axle 21 in a certain direction the flux between the coils is progressively screened off. The angle of rotation can be read off on a scale which can be calibrated for thicknesses of sheet or foil. By suitable shaping of the edge of the screen any desired functional relation can be established between thickness of material measured and angle of rotation of the screen.

The coils 2 and 15 (Fig. 3) are screened off by means of hoods from the influence of outside fields and metallic masses, so that the lines of force can only pass through the material to be measured. The coils are rigidly mounted on a holder, so that they are maintained in fixed spaced relation to each other.

The field at the coil 2 is independent of the position of the material measured between the coils, as long as the frequency remains constant. Since, however, the self-induction of coils is altered by the approach of conductive bodies both the frequency of the coil 15 and also the tuning of the coil 2 is dependent upon the position of the sheet or foil. For the purpose of cancelling this dependence there is provided an arrangement of coils as shown in Figs. 7, 8 and 9. The coil 2 is replaced by the two coils 23 and 26 connected in parallel or in series, and the coil 15 by the two coils 24 and 25 likewise connected in parallel or in series. The metal partitions 28 prevent undesirable reaction between adjacent coils in the screening hoods.

Displacement of the sheet or foil from the midway position implies approach towards one pair of coils and simultaneous removal to the same extent from the other pair of coils. The result achieved by this arrangement of coils is that the self-induction of the coils 23 and 26, which are connected in parallel or in series, remains practically constant on alteration of the position of the sheet or foil relative thereto. The same applies to the total inductivity of the similarly connected coils 24 and 25. The influence of the position of the sheet or foil upon the measurement is thus eliminated.

As is well known, the electric resistance of a metal is generally dependent on its temperature. The same is true of absorption. The result of measurement in the above-described manner will thus be influenced by temperature, and the calibration of the measuring apparatus would have to be referred to a specified temperature. This influence of temperature can be allowed for in reading off the results of measurement. If the thickness D of the sheet or foil at the temperature $\delta$ be read off at the calibrated scale of the instrument the actual thickness is ascertainable by the formula $D=D(1+\alpha\Delta\delta)$, $\alpha$ being the temperature coefficient of the electric resistance and $\Delta\delta$ the temperature difference. The correcting factor $(1+\alpha\Delta\delta)$ can be taken into account in a simple manner, with the aid of a logarithmic calibration curve, the addition of a correction angle to the angle read off. In Fig. 10 is illustrated such logarithmically calibrated scale. The lines 34 denote zero positions for the different temperatures which have been printed or engraved on these lines.

Correcting for the error due to temperature can also be effected by shifting the zero point of the instrument 12 in the direction and to the extent required by the temperature difference. This is preferably achieved by supplying an additional current to the instrument. According to Fig. 11 this current can be derived from the current circuit of a resistance thermometer 35 set to the temperature of the material measured. In this manner the error due to temperature is compensated for automatically. This resistance thermometer 35 is shown to be arranged in one branch of a Wheatstone bridge, while the measuring instrument is arranged in the diagonal of the bridge. When the resistance thermometer 35 varies the bridge arrangement becomes unbalanced and a correction current passes through the measuring instrument.

Figure 4:
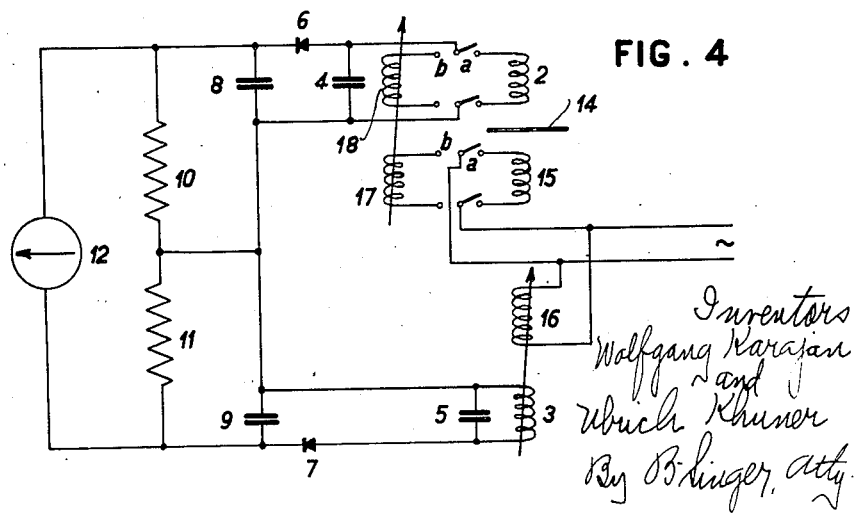
Fig. 4 shows a diagram of connections for a measuring apparatus built to work by the substitution method.

The apparatus based on the arrangement of connections shown in Figs. 2 and 3 comprises, for the purpose of rectification, valves, preferably electron tubes, the characteristic properties of which are not sufficiently constant over long periods to admit of accurate and reliable calibration of the measuring device. This drawback can be obviated by using the system of connections shown in Fig. 4 in which the characteristics of the valves do not exert any influence on the calibration of the device, since the absorption of the sheet or foil 14 (between the coils 2 and 15) is compared with the absorbing effect of the screen of a calibrated reaction variometer comprising the coils 17 and 18. When the changeover switch is in the position a the arrangement corresponds exactly to that of Fig. 3. When this switch is in the position b the reaction variometer with the coils 17 and 18 is so set that the deflection of the pointer of the instrument 12 is the same as previously when the switch was in the position a. At the calibrated scale of the reaction variometer the thickness of the sheet or foil can then be read off. The reaction variometer comprising the coils 3 and 16 is not calibrated, as in the previous example, but serves solely for the maintenance of the system of connections arranged according to the differential principle so as to be unaffected by fluctuations in the voltage of the current supply.

We claim:

1. A device for measuring the thickness of sheet metal and metal foil comprising a source of alternating current, two coils in spaced relation to each other to form an air gap therebetween, one of the said coils being connected to the said source and adapted to serve as a transmitter of electro-magnetic waves, a measuring instrument connected to the other one of said coils, and a regulating member, said instrument being shunted by two serially connected resistances, one of said resistances being connected to the voltage to be measured, the other resistance being connected to a voltage which is opposed to the voltage to be measured and which is adapted to be adjusted by said regulating member to be of the same potential as said voltage to be measured, the position of said regulating member indicating the thickness of the material in said air gap when the measuring indicates that both of said voltages are equal in which case no current passes through said instrument.

2. A device as claimed in claim 1 in which there is associated with the said regulating member a graduated scale which is calibrated for thicknesses of sheet metal and metal foil.

3. A device as claimed in claim 1 in which the said measuring instrument is of a nature to give pointer deflections in different directions when traversed by currents of different direction, so that the direction of the deflection of the pointer will indicate at any one time whether the thickness of the material measured is increasing or decreasing.

4. A device as claimed in claim 1 in which the said regulating member is a variable resistance.

5. A device as claimed in claim 1 in which the said regulating member is a reaction variometer.

6. A device as claimed in claim 1 in which the said regulating member is a reaction variometer, and in which there is further included a metallic screen adapted to regulate the voltage induced by one coil of the said variometer in the countercoil thereof.

7. A device as claimed in claim 1 in which the said regulating member is a reaction variometer, and in which there is further included a metallic screen movable relatively to the axes of the coils of the said variometer and adapted to regulate the voltage induced by one coil of the said variometer in the countercoil thereof.

8. A device as claimed in claim 1 in which the said groups of coils each comprise both transmitter and receiver coils, for the purpose of compensating for fluctuations in total inductivity due to changes in position of the material measured and of maintaining the total inductivity constant, substantially as set forth.

9. A device as claimed in claim 1 in which there is associated with the said regulating member a logarithmically graduated scale which is calibrated for thicknesses of sheet metal and metal foil, and a mark against which the setting of the said regulating member can be read off on the said scale, and in which both the said mark and scale are movable relatively to each other, for the purpose of enabling the reading of said member to be corrected for fluctuations of temperature in the material measured.

10. A device as claimed in claim 1 further comprising an electric resistance thermometer associated with the material to be measured, and in which there is associated with the said regulating member a logarithmically graduated scale which is calibrated for thicknesses of sheet metal and metal foil and a mark against which the setting of the said regulating member can be read off on the said scale, and means for shifting the zero point on the said scale relatively to the said mark in dependence on the operation of the said resistance thermometer, for the purpose of automatically correcting the reading of said member for fluctuations of temperature in the said material.

11. A device as claimed in claim 1 in which the said regulating member is a reaction variometer, and further comprising a change-over switch by which the said measuring instrument can be selectively connected to the said groups of coils and to the said variometer, the said variometer being so adjusted that the same deflections occur at the said instrument in both positions of said switch, so that the thickness of the material measured can be read off at the said variometer unaffected by the characteristics of the parts of the device.

12. In a device for measuring the thickness of sheet metal and metal foil, three coils arranged in axial alinement and also axially spaced from each other, means for connecting the center coil with a source of alternating current, means for connecting the two outer coils in series in a closed circuit, a measuring instrument in said circuit, a resistance in shunt to said measuring instrument, means connecting the center point of said resistance conductively with a portion of said connecting means which connects two ends of said outer coils directly with each other, and means in said circuit adapted for adjusting the voltage induced in one of said outer coils when the material to be measured is placed in the air gap formed between the other outer coil and said center coil, the position of said adjusting means forming an indication adapted for determining the thickness of the material in said air gap when the measuring instrument indicates that no current passes through the same.

13. In a device for measuring the thickness of sheet metal and metal foil, three coils arranged in axial alinement and also axially spaced from each other, means for connecting the center coil with a source of alternating current, means for connecting the two outer coils in series in a closed circuit, a measuring instrument in said circuit, a resistance in shunt to said measuring instrument, means connecting the center point of said resistance conductively with a portion of said connecting means which connects two ends of said outer coils directly with each other, means in said circuit adapted for adjusting the voltage induced in one of said outer coils when the material to be measured is placed in the air gap formed between the other outer coil and said center coil, and means on said adjusting means indicating the thickness of material in said air gap when the measuring instrument indicates that no current passes through the same.

14. In a device for measuring the thickness of sheet metal and metal foil, three coils arranged in axial alinement and also axially spaced from each other, means for connecting the center coil with a source of alternating current, means for connecting the two outer coils in series in a closed circuit, a measuring instrument in said circuit, a resistance in shunt to said measuring instrument, means connecting the center point of said resistance conductively with a portion of said connecting means which connects two ends of said outer coils directly with each other, means associated with each of said outer coils for rectifying the alternating current induced in the same so that only a direct current can pass through said measuring instrument, means in said circuit adapted for adjusting the voltage induced in one of said outer coils when the material to be measured is placed in the air gap formed between the other outer coil and said center coil, the position of said adjusting means forming an indication adapted for determining the thickness of the material in said air gap when the measuring instrument indicates that no current passes through the same, said measuring instrument having a pointer which is adapted to be deflected in both directions depending upon the direction of the current passing through said instrument so that upon adjustment of said adjusting means for a predetermined thickness a deflection of the pointer will indicate whether the material placed in said air gap is thicker or thinner with respect to said predetermined thickness.

15. In a device for measuring the thickness of sheet metal and metal foil, three coils arranged in axial alinement and also axially spaced from each other, means for connecting the center coil with a source of alternating current, means for connecting the two outer coils in series in a closed circuit, a measuring instrument in said circuit, a resistance in shunt to said measuring instrument, means connecting the center point of said resistance conductively with a portion of said connecting means which connects two ends of said outer coils directly with each other, and variable resistance in said circuit adapted for adjusting the voltage induced in one of said outer coils when the material to be measured is placed in the air gap formed between the other outer coil and said center coil, the adjusted position of said variable resistance forming an indication adapted for determining the thickness of the material in said air gap when the measuring instrument indicates that no current passes through the same.

16. In a device for measuring the thickness of sheet metal and metal foil, three coils arranged in axial alinement and axially spaced from each other, means for connecting the center coil with a source of alternating current, means for connecting the two outer coils in series in a closed circuit, a measuring instrument in said circuit, a resistance in shunt to said measuring instrument, means connecting the center point of said resistance conductively with a portion of said connecting means which connects two ends of said outer coils directly with each other, a variable resistance in said circuit adapted for adjusting the voltage induced in one of said outer coils when the material to be measured is placed in the air gap formed between the other outer coil and said center coil, and means on said resistance indicating the thickness of material in said air gap when said resistance has been adjusted so that no current passes through said measuring instrument.

WOLFGANG KARAJAN.
ULRICH KHUNER.